UNITED STATES PATENT OFFICE.

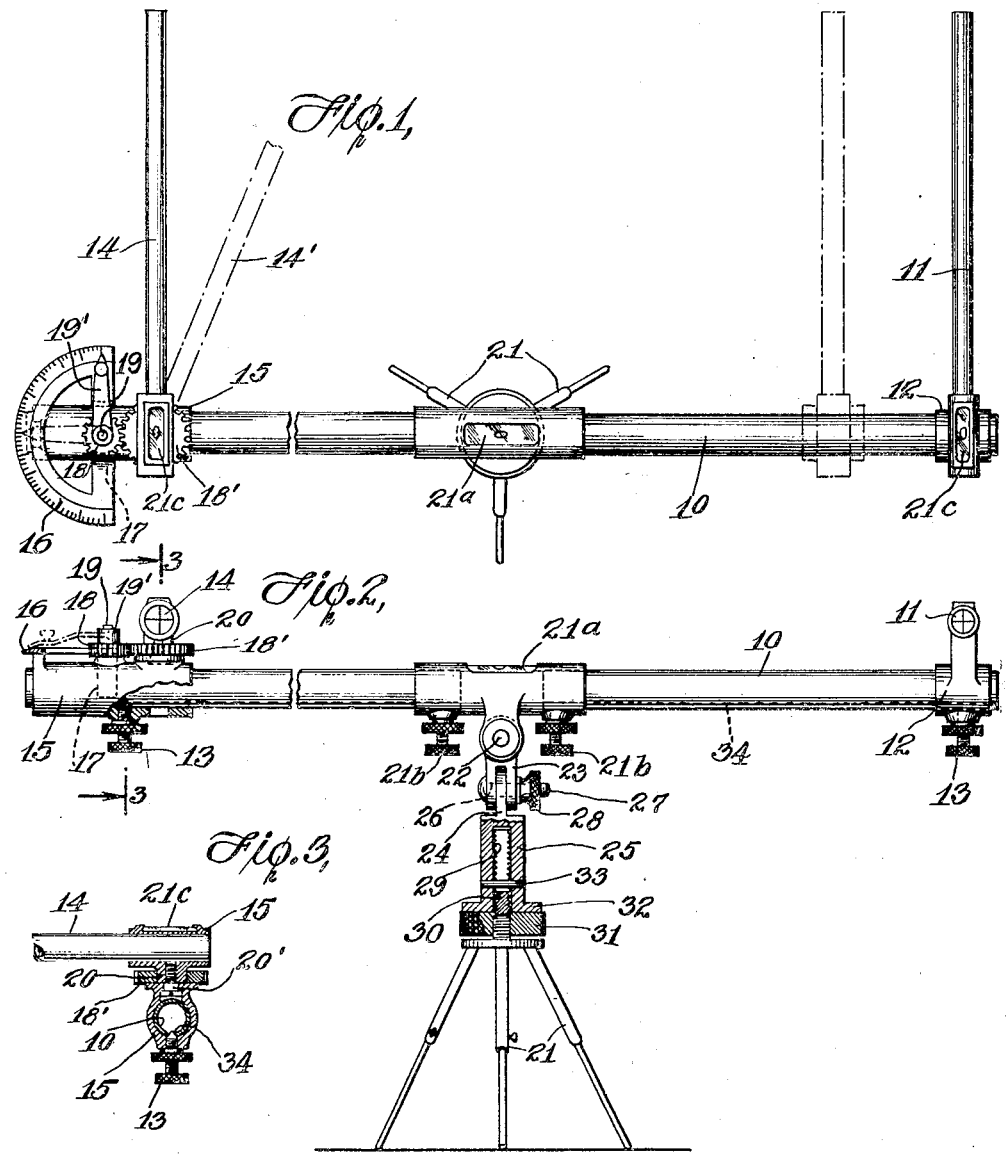

LOWREY A. WEED, OF NEW YORK, N. Y.

RANGE-FINDER.

1,359,133. Specification of Letters Patent. Patented Nov. 16, 1920.

Application filed October 12, 1917. Serial No. 196,111.

*To all whom it may concern:*

Be it known that I, LOWREY A. WEED, a citizen of the United States, and resident of New York city, in the county of Kings and State of New York, have invented certain new and useful Improvements in Range-Finders, of which the following is a specification.

This invention relates to range finders.

My main object is to provide an apparatus for readily determining accurately the distance from a point of observation to an object.

Another object of my invention is to provide an apparatus of this character which is compact and neat in construction and light in weight.

A further object of my invention is to provide an apparatus of this character which shall be constructed of few parts that may be easily assembled when the instrument is to be used and taken apart to be packed into a portable form when the instrument is not in use.

A still further object of this invention is to provide in an instrument of this character a scale for reading the ranges, and means for magnifying the small angular movement of the observation tube into a large angular reading on said scale.

A still further object of this invention is to provide an instrument of the character described which may easily be leveled and all parts be in proper alinement when they are assembled.

Further objects and advantages of this invention will appear from the detailed description, and the features of novelty will be more particularly pointed out in the claims.

In the drawing accompanying this specification,

Figure 1 is a plan view of my novel range finder with all the parts assembled,

Fig. 2 is a vertical elevation of the same, and

Fig. 3 is a section cut along line 3—3 of Fig. 2.

Referring in detail to the drawing, 10 indicates a tube on one end of which is removably mounted as by means of a sleeve 12 and screw 13, a telescope 11 for sighting an object. A range telescope 14 is similarly mounted at the opposite end and is adapted to be given an angular movement in a horizontal plane in the direction of the sighted object as shown in the dotted position 14'. The sleeve 15 which carries the range telescope also has secured thereto the range scale 16 which is held thereon in some suitable manner as by means of side flanges 17. A pin 19 serves as a shaft on which are rotatably mounted a small gear 18 and the pointer 19'. The range telescope 14 is held by means of the projection 20 and screw 20' to a larger gear 18' which is adapted to rotate with the angular movement of the former and to mesh with the smaller gear.

The instrument may be removably mounted on a suitable base such as a tripod 21, and in order that the tube 10 may be accurately adjusted in true horizontal position, the level 21$^a$ having the screws 21$^b$ for the attachment thereof to the casting 21$^c$ is mounted at the center thereof. The casting is rotatable in a vertical plane about the axis 22 and may also be made rotatable in a direction perpendicular to this plane in some suitable manner so as to permit the instrument to be accurately leveled. In the form shown in the drawing the casting is formed with the central vertical extension 23, slotted to be slipped over the vertical projection 24 of the supporting member 25. The slotted extension 23 has its sides perforated as at 26 to receive the threaded pin 27 on which operates the knob 28. When the latter is loosened the apparatus may be swung back and forth until adjusted level. In order that the instrument may be adjusted to varying heights the supporting member 25 is formed with the threaded cylindrical bore 29 within which operates the screw 30 adapted to be manipulated by means of the knurled head 31. The supporting member 25 is formed with a flanged end 32 adapted to rest against the head 31 and a pin 33 passes through the body of the supporting member as shown to prevent the whole instrument from turning with the head 30 when the latter is manipulated to adjust the height thereof.

As will be clear from Fig. 3 the tube 10 is slit longitudinally as at 34 so as to permit it to spread when the screws 13 are tightened to secure the sleeves 12 and 15. When these screws are manipulated the telescopes are at the same time leveled as indicated by the level 21$^c$ so that the leveling of the telescopes is accomplished at the same time as the parts are assembled and adjusted in position and in proper alinement.

In the use of my instrument the horizontal tube 10 is first mounted on the tripod and the telescopes slipped on at either end. The instrument is then leveled in the manner already explained and adjusted to the desired height above the ground. The distant object is first sighted through the telescope 11 and the telescope 14 is then turned toward the object until sighted on the cross-hairs. The angular displacement of the range telescope is magnified as already explained and recorded in yards or suitable units on the empirically graduated scale.

It will readily be clear from the drawing and description that the various parts of the instrument namely, the telescopes, scale, and supporting members may all be readily detached when the instrument is not in use and the parts packed into a suitable case. These parts are made preferably of very light material so that the whole instrument shown to scale is one capable of reading ranges of about 2,000 yards or less. But the parts may of course be designed so as to enlarge this range of operation without departing from the spirit and scope of the appended claims.

Having thus described my invention what I claim as new and desire to secure by Letters Patent is,

1. A portable range finder comprising a central casting having a level mounted therein, a tube extending therefrom at each side and in axial alinement with each other, a sight telescope mounted on the end of one of said tubes, a range telescope mounted on the opposite tube and adapted to rotate in a horizontal plane, a scale of ranges mounted adjacent said range telescope, an indicator for the same and means for securing the tubes and telescopes connected thereto in adjusted position.

2. A portable range finder comprising a central casting having a level mounted therein, and a tube removably held in said central sleeve and extending therefrom at each side and in axial alinement with each other, a sight telescope mounted on the end of one of said tubes, a range telescope mounted on the opposite tube and adapted to rotate in a horizontal plane, a scale of ranges mounted adjacent said range telescope, an indicator for the same for securing the tubes and telescopes connected thereto in adjusted position.

3. A range finder comprising a casting, a tube projecting from each end thereof and each having a longitudinally extending slot therein, means for holding said tubes in said casting and said slots in alinement with each other, an angularly adjustable telescope mounted on one of said tubes, a sight telescope mounted on the other tube and means which enter said slots to hold the telescopes in the same horizontal plane.

4. A range finder comprising a casting, a tube projecting from each end thereof and each having a longitudinally extending slot therein, means for holding said tubes in said casting and said slots in alinement with each other, an angularly adjustable telescope mounted on one of said tubes, a sight telescope mounted on the other tube and means which enter said slots to hold the angularly adjustable telescope and sight telescope in the same horizontal plane, said sight telescope having a dial and an indicator located adjacent thereto substantially as illustrated.

5. A range finder comprising a central casting, a tube extending therefrom at each side thereof in axial alinement with each other, and each having a longitudinally extending slot therein, an angularly adjustable telescope mounted on one of said tubes, a sight telescope mounted on the other of said tubes, both of which are guided by said slots in the same horizontal plane, and means whereby said telescopes may be simultaneously moved into a horizontal position and held therein.

6. A range finder comprising a central casting, a tube extending therefrom at each side thereof in axial alinement with each other, and each having a longitudinally extending slot therein, an angularly adjustable telescope mounted on one of said tubes, a sight telescope mounted on the other of said tubes, both of which are guided by said slots in the same horizontal plane, and means whereby said telescopes may be simultaneously moved into a horizontal position and held therein, and means for raising and lowering the tubes simultaneously without otherwise disturbing their relative positions to each other.

Signed at New York city in the county of Kings and State of New York this 19th day of September A. D. 1917.

LOWREY A. WEED.

Witnesses:
  FRANK M. ASHLEY,
  GEORGE DOAN RUSSELL.